United States Patent [19]

Repetti et al.

[11] Patent Number: 4,820,460
[45] Date of Patent: Apr. 11, 1989

[54] METHOD OF MANUFACTURING A HOLLOW POROUS FIBER

[75] Inventors: Ronald V. Repetti, Guilford; Scott P. Yaeger, Cheshire, both of Conn.; Chaokang Chu, Lexington, Mass.

[73] Assignee: CUNO, Incorporated, Meriden, Conn.

[21] Appl. No.: 43,003

[22] Filed: Apr. 27, 1987

[51] Int. Cl.$^4$ .............................................. D01D 5/247
[52] U.S. Cl. ..................................... 264/41; 264/561; 264/562; 264/571; 264/184; 264/209.1; 264/209.2; 264/211.16; 264/101; 210/500.23; 210/500.38
[58] Field of Search ............... 264/178 R, 178 F, 183, 264/184, 41, 49, 561, 562, 101, 571, 209.1, 209.2, 211.16; 425/67-70; 210/500.23, 500.38

[56] References Cited

U.S. PATENT DOCUMENTS

| | | | |
|---|---|---|---|
| 3,050,775 | 8/1962 | Levison et al. | 425/70 |
| 3,084,384 | 4/1963 | Denyes et al. | 264/181 |
| 3,154,609 | 10/1964 | Cipriani | 264/184 |
| 3,199,148 | 8/1965 | Koppehele | 264/180 |
| 3,412,191 | 11/1968 | Kitajima et al. | 264/184 |
| 3,842,151 | 10/1974 | Stoy et al. | 264/205 |
| 3,876,738 | 4/1975 | Marinaccio et al. | 264/184 |
| 4,154,856 | 5/1979 | Akin | 264/181 |
| 4,323,627 | 4/1982 | Joh | 264/561 |
| 4,340,479 | 7/1982 | Pall | 210/500.21 |
| 4,604,208 | 8/1986 | Chu et al. | 210/650 |

Primary Examiner—Jan H. Silbaugh
Assistant Examiner—Hubert C. Lorin
Attorney, Agent, or Firm—Weingram & Zall

[57] ABSTRACT

A quench bath, for quenching and solidifying an extruded hollow porous fiber of a liquid polymer solution in a chemical quenching solution, includes a shallow quench bath of a length for the generally horizontal part of the extruded fiber travel in the bath. A vertical extension tube with its lower end beneath the surface of the bath liquid holds a spinneret through which the fiber is extruded. The spinneret is sealed in the tube above the height of the liquid in the shallow bath. A vacuum drawn in the tube raises the liquid up to the spinneret. Also, the vacuum may be drawn by disposing the spinneret in a sealing piston which is raised through the tube to draw the vaccum in the tube behind the piston.

8 Claims, 1 Drawing Sheet

SPINNERET / PISTON
IN OPERATING POSITION

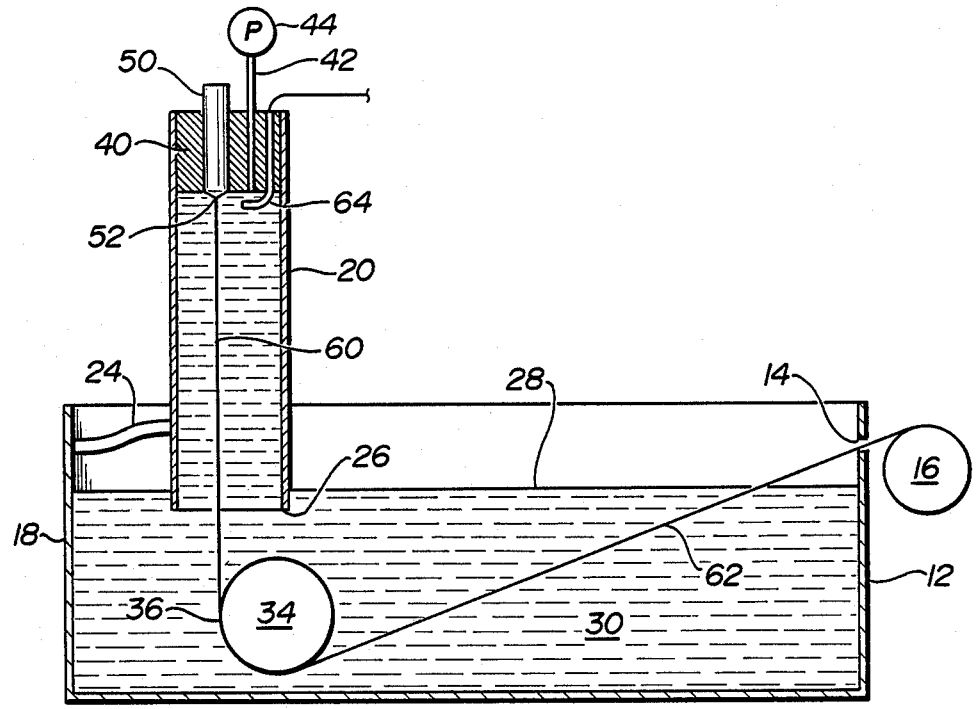
FIG-1  SPINNERET / PISTON IN OPERATING POSITION
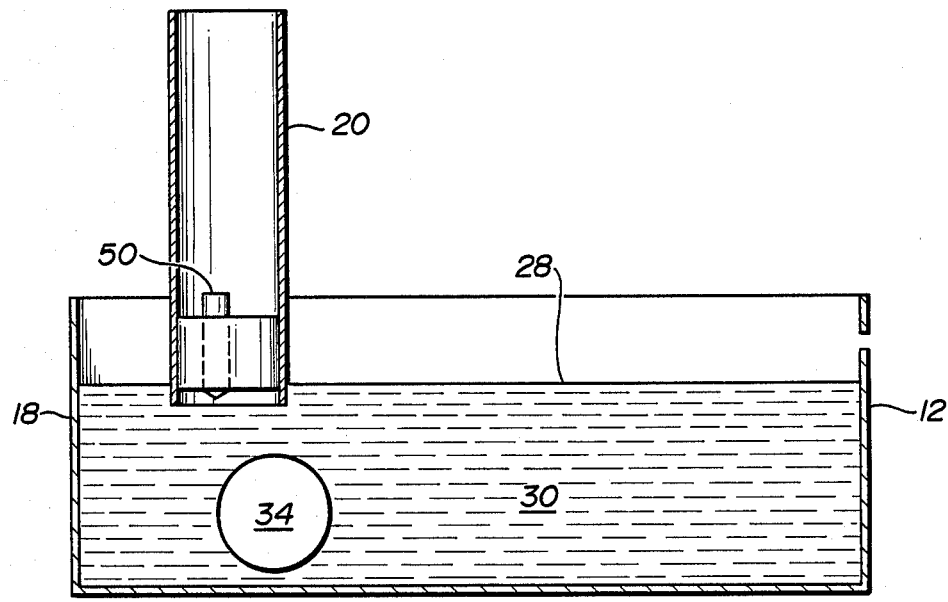
FIG-2  SPINNERET / PISTON IN START UP POSITION

METHOD OF MANUFACTURING A HOLLOW POROUS FIBER

BACKGROUND OF THE INVENTION

The present invention relates to the manufacture of hollow porous fibers produced from a liquid polymer solution, and particularly to the quenching of those fibers in a quench bath following their extrusion.

Quench baths are known, as in U.S. Pat. No. 3,199,148 to Koppehele. Extruding of polymer filaments is known, for example, from U.S. Pat. No. 3,084,384 to Denyes et al. Fiber extrusions are also known from U.S. Pat. No. 4,154,856 to Akin.

The production of hollow porous fibers, i.e. microporous, fibers, and in particular skinless, nylon microporous filter fibers, is also well known, see for example, U.S. Pat. No. 3,876,738 to Marinaccio and Knight and U.S. Pat. No. 4,604,208 to Chu et al., the entire disclosures of which are incorporated herein by reference.

The production of hollow porous fibers involves extruding a hollow tube of liquid polymer solution, referred to as dope, into a chemical quenching solution, which causes the hollow porous fiber structure to form. During the extrusion, the dope emerging from the extrusion die, referred to as a spinneret, is essentially still in liquid form. It gradually solidifies over time while exposed to the chemical quenching solution held in a quench bath.

If a nascent, not yet solid, hollow fiber is bent or otherwise distorted while it is still predominantly in its liquid form, the cross section of the fiber will become permanently distorted and it will no longer have the concentric circular inner diameter and outer diameter cross section which it had as it was emerging from the spinneret.

It is desired to maintain a concentric, circular cross section for the hollow fiber. It is known that one way for achieving that objective is to design the chemical quench bath to maximize the vertical distance directly beneath the spinneret through which the fiber can descend. This provides the fiber with the longest possible time to form and solidify, before the fiber is finally made to change direction by being led around a reel, roll or other guide and thereafter exit the quench bath horizontally. Obviously, a very deep or tall quench bath is desired, especially in making large diameter fibers, that is those having an outer diameter of 30 mils or more. Very deep baths have practical problems, however. These include large bath volume and relative difficulty in gaining access to the bottom area of the bath for maintenance or to retrieve items that may have fallen into the bath. The need for large bath volume arises because once the fiber is redirected, e.g. around guides, it moves over a generally horizontal path to the bath exit and the deep bath must also be wide enough to provide the horizontal path.

SUMMARY OF THE INVENTION

Accordingly, it is the primary object of the present invention to obtain the benefits of a deep quench bath during the manufacture of hollow porous fibers while retaining the benefits of a relatively shallow main quench tank. Therefore, it is another object of the invention to provide a deep quench bath without having a large bath volume and avoiding difficulty in obtaining access to the lower bath areas.

The present invention provides a hollow fiber vertical quench bath having a relatively shallow main quench bath tank which communicates directly with a tall, thin, vertical extension tube that is filled with the bath liquid and that provides the needed vertical quench bath beneath the spinneret. The hollow fiber extruded from the spinneret passes vertically down through the thin, elongate vertical extension tube where it is quenched by the bath liquid and gradually solidifies. Beneath the tube and in the main quench bath tank is positioned a guide roll or other means for changing the direction of the fiber. Then the redirected fiber moves generally horizontally away from beneath the vertical extension tube and through the shallow quench bath to the fiber exit. Thus, the invention provides the dual benefit of a tall or deep quench bath for the vertical portion of the fiber travel path and a wide, shallow quench bath for the horizontal portion of its travel.

The vertical extension tube, supported above the shallow quench bath, has a lower end which is beneath the surface of the shallow quench bath. The spinneret is held at the top of the vertical extension tube, and the vertical extension tube is sealed around the spinneret. For example, the spinneret may be disposed in a piston which is sealed at the top of the tube. A vacuum is drawn in the vertical extension tube, e.g. by starting with the spinneret holding piston at the bottom of the vertical tube and drawing the sealed piston sealed at the top of the tube and drawing a vacuum in the tube. The level of liquid in the vertical tube is raised preferably up to the exit from the spinneret so that the dope moves through the chemical quenching solution over the maximum vertical path. Also, for some dope systems, it is desirable not to expose the dope to an atmosphere other than that of the liquid quench solution.

There are benefits of this arrangement. The vertical distance between the spinneret and the fiber quide roll around which the fiber is redirected is maximized, assuring that the fiber ultimately has the most circular cross section possible. The quench solution in the extension tube is relatively quiescent, because the cross section of that tube is smaller. This is important to preservation of the fiber due to the low physical strength of the nascent fiber, especially at the top of the tube when the fiber is in its most liquid state. One particular benefit is that the bath liquid in the shallow, main quench tank can be agitated to prevent stratification in that tank. Agitation is possible because the agitation in the main tank does not travel through the narrow extension tube and because the extension tube protects the fiber where it is most delicate and weak.

The quench fluid in the extension tube might build up an excessive concentration of solvent for the polymer and/or exhausted solvent. Optionally, therefore, it may be necessary to provide a quiescent supply of fresh quench fluid near the top of the extension tube where the spinneret is positioned during the fiber spinning. The supply may be through a porous sparger at the top of the tube, for example.

Other objects and features of the present invention will become apparent from the following description of preferred embodiments of the invention considered in conjunction with the accompanying drawings.

BRIEF DESCRIPTION OF THE DRAWINGS

FIG. 1 is a schematic cross sectional view of a fiber spinning apparatus and quench bath according to the present invention with the fiber spinning apparatus and quench bath in the operational position.

FIG. 2 is the same view as FIG. 1, before fiber spinning according to the invention begins and illustrating the features of the invention.

DESCRIPTION OF THE PREFERRED EMBODIMENTS

A quench bath according to the present invention is used for hardening hollow porous fibers which are extruded in a hollow tube of liquid polymer solution, called a dope. Such extrudable polymer solutions are well known in the art and include, for example, those described in U.S. Pats. Nos. 3,876,738 to Marinaccio and Knight, 4,604,208 to Chu et al., as well as U.S. Pat. No. 4,340,479 to Pall, the entire disclosures of which are incorporated herein by reference.

The quench bath is contained in a relatively larger cross section main tank or vessel 12, which has a relatively long length in the direction along which the fiber 20 is drawn generally horizontally, but which could be considerably narrower in the width direction, having to be wide enough to permit passage of the fiber and to permit access into the quench bath vessel for cleaning and to provide space for other objects, such as a guide roll, described below, which must be placed within the vessel 12. The vessel 12 is generally unpressurized, and is illustrated as being open-topped, although that is not required. The vessel has an outlet opening 14 in its side through which the by then hardened, solidified fiber is drawn out of the bath vessel 12 to be received on a storage roll 16, for example.

Toward one end 18 of the vessel 12 along the length dimension, there is supported a vertical extension tube 20 which is considerably narrower in its width along the length dimension of the vessel 12 than is the length of the vessel. The tube 20 is preferably also of narrower width than the vessel 12, i.e. of much smaller cross-section than the vessel 12. The vertical extension tube need merely be of a cross section sufficiently larger than the fiber that moves through it, that the liquid in the vertical extension tube can adequately quench the fiber and cause it to solidify, by acting upon it. If the tube were too narrow, there would not be sufficient circulation around the just extruded fiber and quench chemicals would be too rapidly exhausted and/or contaminated, e.g. with polymer solvent. For example, excess formic acid solvent for nylon polymer would develop in the liquid in the tube, see the aforementioned U.S. Pat. No. 3,876,738 to Marinaccio and Knight. The narrowness of the cross section of the extension tube not only permits a smaller amount of quench liquid to be used for forming a fiber, but it also dampens any agitation of the fluid in the tube, protecting the nascent fiber, particularly just after the fiber has been extruded and it is in a liquid state and weak.

The tube is supported at 24 in the vessel at a height such that the bottom 26 of the tube 20 would normally be below the surface 28 of the liquid 30 in the vessel 12. For example, a vertical extension tube, between the exit from the spinneret and the top of the liquid bath in the vessel 12, might have a height of 60 in. and might have a cross sectional area of 7-14 sq. in. The tube 20 typically has a uniform cross section to permit the below described piston 40 to be moved along it. However, in an alternate embodiment with the piston normally sealed in upraised position, the tube need not have a uniform cross section.

The vessel 12 is filled with a standard quench bath selected for solidifying the respective liquid polymer solution. For example, for a polymer solution of nylon, formic acid and methanol, the quench bath might comprise methanol and water, (see Marinaccio and Knight).

There is disposed within the vessel 12 a supported guide roll 34, which is disposed beneath the tube 20. The point 36 on the surface of roll 34 at which the fiber first contacts the redirecting guide roll 34 is preferably vertically directly beneath the below described exit 52 from the spinneret, so that the fiber extruded through the spinneret exit moves vertically through the extension tube, and not at an incline, which might adversely affect the uniformity of its hollow cross section.

As shown in FIG. 1, there is sealed at the top of the tube 20 a tube sealing piston 40 which remains fixed in position during the extrusion of the dope and the passage of the fiber through the quench bath liquid filled vertical extension tube.

A liquid polymer solution extruding die or spinneret 50 is sealingly supported in the piston and is connected to a supply of dope (not shown) which is to be extruded through the die. The spinneret has an outlet exit 52 and the spinneret conventionally extrudes the dope into the thin, hollow, fiber 60 which exits vertically downward through the outlet 52. Preferably, the vertical extension tube is filled with the quench bath liquid all the way up to the exit 52 and the underside of the piston 40. Thus, the entire vertically downward path of travel of the fiber 60 is through the quench bath liquid. The height of the extension tube 20 is selected so that by the time the fiber 60 has moved into contact at 36 with the redirecting guide roll 34, the fiber is substantially solidified, and the redirection of the fiber around the guide roll does not undesirably alter the cross section of the fiber. Once the fiber has passed the roll 34, its run 62 passes through the shallow quench bath 30 generally horizontally. The pathway of the run 62 of the fiber is inclined gradually upwardly, so that the fiber emerges through the top 28 of the liquid bath just before exiting through the exit 4 from the vessel 12. The length of the vessel 12 assures that the fiber has been solidified before it exits through the exit 14.

It is preferred that the quench bath liquid be drawn up in the tube 20 sufficiently to cover the outlet 52 from the spinneret 50, for maximizing the length of the path of the fibers 60 through the quench bath and making the preferred type microporous hollow fibers. If the level of the quench bath is slightly lower, this will still not interfere with proper operation of this invention, although different type fibers may be produced.

The bath liquid 30 is brought up to the outlet 52 from the spinneret by creating a vacuum in the tube 20 which draws the bath liquid up through the vertical tube 20 to the outlet 52. One way of accomplishing this is to evacuate the tube 20 through suction line 42 that passes through the piston 40 and is suctioned through pump 44. An appropriate valve, such as a float valve, would prevent the liquid in the tube 20 from being sucked out.

Another technique for filling the vertical tube 20 is illustrated by a comparison of FIGS. 1 and 2. Initially, before the hollow fibers are extruded, the piston 40, with the spinneret 50 installed, is at the bottom of the tube, with the exit 52 below the top 28 of the liquid bath (FIG. 2). The piston and spinneret are drawn to the top of the tube, e.g. by a drive mechanism fixed at one end of the piston. Since the piston is sealed on the wall of the tube and the wall of the tube 20 has a substantially constant cross section over its height, raising of the piston draws a vacuum in the tube beneath the piston and that vacuum is filled by bath liquid drawn out of the vessel 12. This method also has the advantage of being easier to start up, i.e. the fiber extrusion process can be established while the spinneret is in the lower position, where it is accessible to an operator, should there be an upset in the start-up operation. Once the fiber extrusioin process has been established, the piston/spinneret can be drawn to the top of the extension tube from which fiber production is conducted. It may additionally be necessary to later use the vacuum to maintain the liquid level in tube 20, as air leakage past the piston may occur and gas may eventually partially fill the tube 20.

The quench bath liquid in the vertical tube, especially near the spinneret, may eventually develop excess concentration of substances, e.g. solvents, resulting from the extrusion of the polymer solvent into the quench bath, e.g. excess formic acid concentration may develop. A separate supply of quench bath liquid may be drawn from the tank 12 and pumped out through a porous sparger 62 located at the top of the tube and supported from the piston 40. This delivers a constant supply of fresh quench fluid which avoids agitating the liquid in the tube and minimizes the concentration of undesirable substances therein.

There has just been described a quench bath for an extruded polymer fiber which is afforded an extended vertical path of travel through the quench bath by passage through an elongate vertical extension tube which is filled with the quench bath liquid and which communicates into the larger cross section, shallow quench bath through which the fiber has its redirected, generally horizontal run.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A method of manufacturing a hollow porous fiber from a liquid polymer solution, comprising the steps of:
    (a) placing into a vessel a chemical quenching liquid which is capable of solidifying and forming pores in an extruded liquid polymer fiber;
    (b) placing a spinneret having a spinneret outlet in a tube having a top and a bottom opening, which tube is partially submerged in and extends vertically from said chemical quenching liquid such that the spinneret outlet is proximate said chemical quenching liquid;
    (c) sealing the spinneret in the tube;
    (d) moving the sealed spinneret up through the tube so as to draw a vacuum behind the rising spinneret and hence, draw the quenching liquid into the tube;
    (e) extruding liquid polymer solution out through the spinneret outlet and down through the tube and into the vessel; and
    (f) redirecting the fiber in the vessel into a generally horizontal direction through the vessel.

2. A method of manufacturing according to claim 1, wherein the spinneret is in contact with the chemical quenching liquid during extruding step (e).

3. A method of manufacturing according to claim 1, wherein steps (d) and (e) are performed in reverse sequence.

4. A method of manufacturing a hollow nylon microporous filter fiber from a liquid nylon polymer solution, comprising the steps of:
    (a) placing into a vessel a chemical quenching liquid which is capable of solidifying and forming pores in an extruded liquid nylon polymer fiber;
    (b) placing a spinneret having a spinneret outlet in a tube having a top and a bottom opening, which tube is partially submerged in and extends vertically from said chemical quenching liquid such that the spinneret outlet is proximate said chemical quenching liquid;
    (c) sealing the spinneret in the tube; and
    (d) moving the sealed spinneret up through the tube so as to draw a vacuum behind the rising spinneret and hence, draw the quenching liquid into the tube;
    (e) extruding liquid nylon polymer solution out through the spinneret outlet and down through the tube and into the vessel; and
    (f) redirecting the fiber in the vessel into a generally horizontal direction through the vessel.

5. A method of manufacturing according to claim 4, wherein the nylon microporous membrane is skinless.

6. A method of manufacturing according to claim 5, wherein the spinneret is in contact with the chemical quenching liquid during extruding step (e).

7. A method of manufacturing according to claim 4, wherein the spinneret is in contact with the chemical quenching liquid during extruding step (e).

8. A method of manufacturing according to claim 4, wherein steps (d) and (e) are performed in reverse sequence.

* * * * *